United States Patent
Urushibata et al.

(10) Patent No.: US 9,679,282 B2
(45) Date of Patent: Jun. 13, 2017

(54) READING APPARATUS

(71) Applicant: TOSHIBA TEC KABUSHIKI KAISHA, Shinagawa-ku, Tokyo (JP)

(72) Inventors: Yoshimi Urushibata, Shizuoka (JP); Toshihiro Kaneko, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/607,153

(22) Filed: Jan. 28, 2015

(65) Prior Publication Data

US 2015/0227908 A1 Aug. 13, 2015

(30) Foreign Application Priority Data

Feb. 10, 2014 (JP) .................................. 2014-023601

(51) Int. Cl.
| | |
|---|---|
| *G06K 7/01* | (2006.01) |
| *G06Q 20/20* | (2012.01) |
| *G07G 1/00* | (2006.01) |
| *G07G 1/01* | (2006.01) |
| *G07G 1/12* | (2006.01) |

(52) U.S. Cl.
CPC ............. *G06Q 20/208* (2013.01); *G06K 7/01* (2013.01); *G06Q 20/204* (2013.01); *G07G 1/0018* (2013.01); *G07G 1/0045* (2013.01); *G07G 1/01* (2013.01); *G07G 1/12* (2013.01); *G07G 1/0036* (2013.01)

(58) Field of Classification Search
CPC ....................................................... G06K 7/01
See application file for complete search history.

(56) References Cited

U.S. PATENT DOCUMENTS

| | | | | |
|---|---|---|---|---|
| 5,900,614 | A  * | 5/1999 | Nakakawaji et al. ... | 235/462.14 |
| 6,390,363 | B1 * | 5/2002 | Morrison et al. ............. | 235/383 |
| 6,829,467 | B2 * | 12/2004 | Ochiai ................. | G06Q 20/105 |
| | | | | 235/380 |
| 7,000,833 | B2 * | 2/2006 | Sato ..................... | G07G 1/0045 |
| | | | | 186/59 |

(Continued)

FOREIGN PATENT DOCUMENTS

| | | |
|---|---|---|
| JP | 2000-067322 | 3/2000 |
| JP | 2005-157572 | 6/2005 |

(Continued)

OTHER PUBLICATIONS

Japanese Office Action for Japanese Patent Application No. 2014-023601 mailed on Nov. 22, 2016.

*Primary Examiner* — Christle I Marshall
(74) *Attorney, Agent, or Firm* — Amin, Turocy & Watson LLP

(57) ABSTRACT

In accordance with one embodiment, a reading apparatus, arranged at a position between an operator and a customer who stand in face to face manner, comprises a main body having an opening on a surface thereof facing the operator, a first image capturing section for operator, housed in the main body, configured to photograph a commodity through the opening of the main body to capture an image of the commodity, and a second image capturing section for customer, arranged on the main body, configured to photograph an object held by the customer to capture an image of the object.

16 Claims, 7 Drawing Sheets

(56) References Cited

U.S. PATENT DOCUMENTS

| | | | |
|---|---|---|---|
| 7,841,524 B2* | 11/2010 | Schmidt | A47F 9/04 177/25.15 |
| 7,970,650 B2* | 6/2011 | Tokorotani | 705/17 |
| 8,360,320 B2* | 1/2013 | Collins et al. | 235/462.43 |
| 8,702,002 B2* | 4/2014 | Gregerson | 235/462.14 |
| 2007/0255665 A1* | 11/2007 | Oosugi | A47F 9/047 705/414 |
| 2011/0142371 A1* | 6/2011 | King | G06Q 30/00 382/313 |
| 2011/0225055 A1* | 9/2011 | Takahashi | G06Q 20/20 705/16 |
| 2011/0309147 A1* | 12/2011 | Barkan et al. | 235/440 |
| 2013/0101168 A1 | 4/2013 | Naito et al. | |
| 2013/0193210 A1 | 8/2013 | Iizaka et al. | |
| 2013/0259320 A1 | 10/2013 | Gotanda | |

FOREIGN PATENT DOCUMENTS

| | | |
|---|---|---|
| JP | 2006-99174 | 4/2006 |
| JP | 2012-53785 | 3/2012 |
| JP | 2012-195007 | 10/2012 |
| JP | 2013-89085 | 5/2013 |
| JP | 2013-152761 | 8/2013 |
| JP | 2013-210971 | 10/2013 |
| JP | 2013-214336 | 10/2013 |

* cited by examiner

FIG.2
(a)
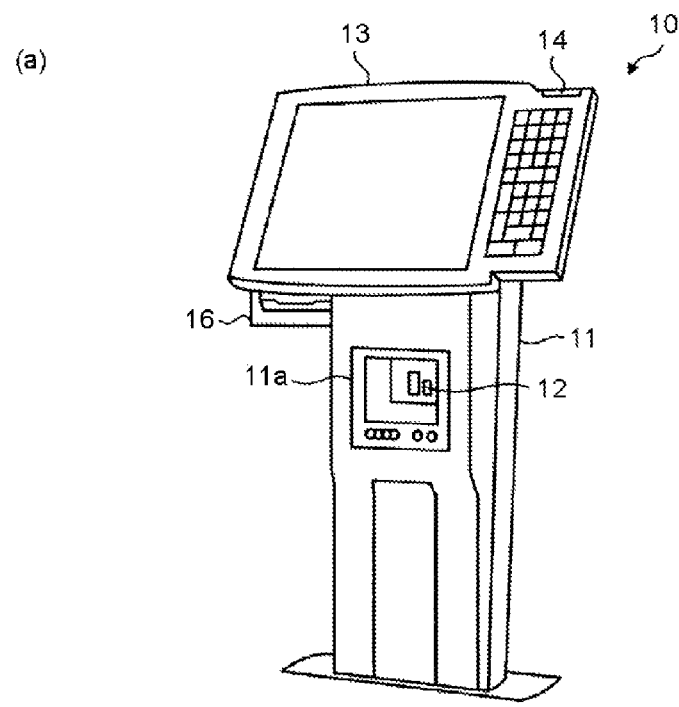
(b)
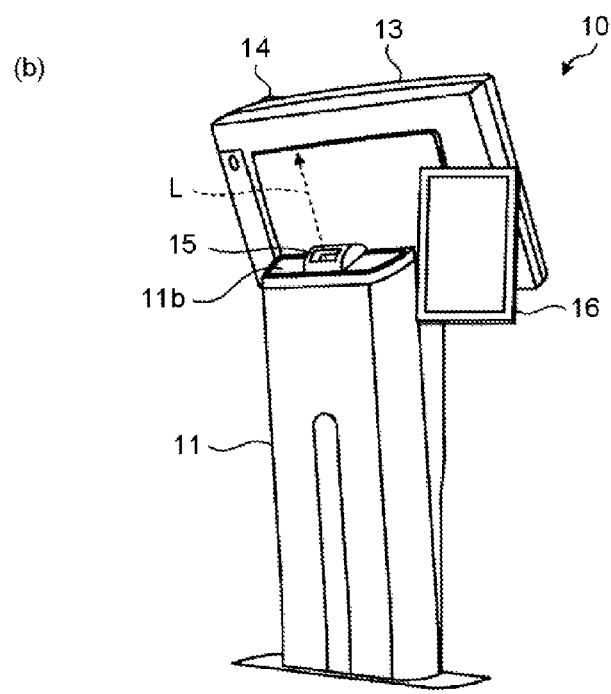

READING APPARATUS

CROSS-REFERENCE TO RELATED APPLICATION

This application is based upon and claims the benefit of priority from Japanese Patent Application No. 2014-023601, filed Feb. 10, 2014, the entire contents of which are incorporated herein by reference.

FIELD

Embodiments described herein relate generally to a reading apparatus which scans or reads a commodity or a code symbol attached to the commodity.

BACKGROUND

In a store such as a supermarket and the like, a customer who purchases commodities puts displayed commodities in a shopping basket or a cart and carries the shopping basket or cart to a checkout counter. A shop clerk carries out checkout work at the checkout counter. A reading apparatus such as a barcode scanner for reading commodity information is arranged on the checkout counter. The shop clerk, standing at a position opposite to the customer across the checkout counter, reads the commodities brought by the customer one by one through the reading apparatus to input information relating to the commodity to be purchased.

Conventionally, there are provided various services for promoting sales in the store. For example, a service card such as a membership card, a so-called point card, and the like is distributed to customers, and points that are given according to purchase amount are stored cumulatively in a store server in association with the point card. The given points are used to receive a discount or exchange a commodity corresponding to the point amount from the next transaction and thereafter.

Further, the following service is also performed in the store. Service information indicating that a service such as a discount and the like is provided is announced in an advertisement medium such as a flier and the advertisement medium is widely distributed to customers. And only customers who present the advertisement medium or the service information can receive such a service.

Incidentally, in the constitution of the conventional checkout counter (registration apparatus), in a case in which the customer shows the service card or service information to an operator, the work of the shop clerk (operator) is interrupted, or the customer has to show the service card or service information before the registration work of the shop clerk is started or after the registration work of the shop clerk is completed, in general. As a result, there is a possibility that the work efficiency of the shop clerk is dropped. Further, there is also a problem that showing the service card or service information is too troublesome for customers.

In recent years, it is more and more popular to provide service information through a communication line such as an E-mail, a Web page and the like. In this case, customers receive the service information provided through the communication line with an information communication terminal such as a mobile phone and the like. The customers can show the display screen of the information communication terminal to the shop clerk to enjoy the service. However, there is a possibility that there are some customers who hesitate to show his/her information communication terminal in view of reason for privacy.

BRIEF DESCRIPTION OF THE DRAWINGS

FIG. 2 is a perspective view illustrating a reading apparatus;

DETAILED DESCRIPTION

In accordance with one embodiment, a reading apparatus, arranged at a position between an operator and a customer who stand in face to face manner, comprises a main body, a first image capturing section for operator and a second image capturing section for customer. The main body includes an opening on a surface thereof facing the operator. The first image capturing section is housed in the main body to photograph a commodity through the opening of the main body to capture an image of the commodity. The second image capturing section is arranged on the main body to photograph an object held by the customer to capture an image of the object.

Figure 1:
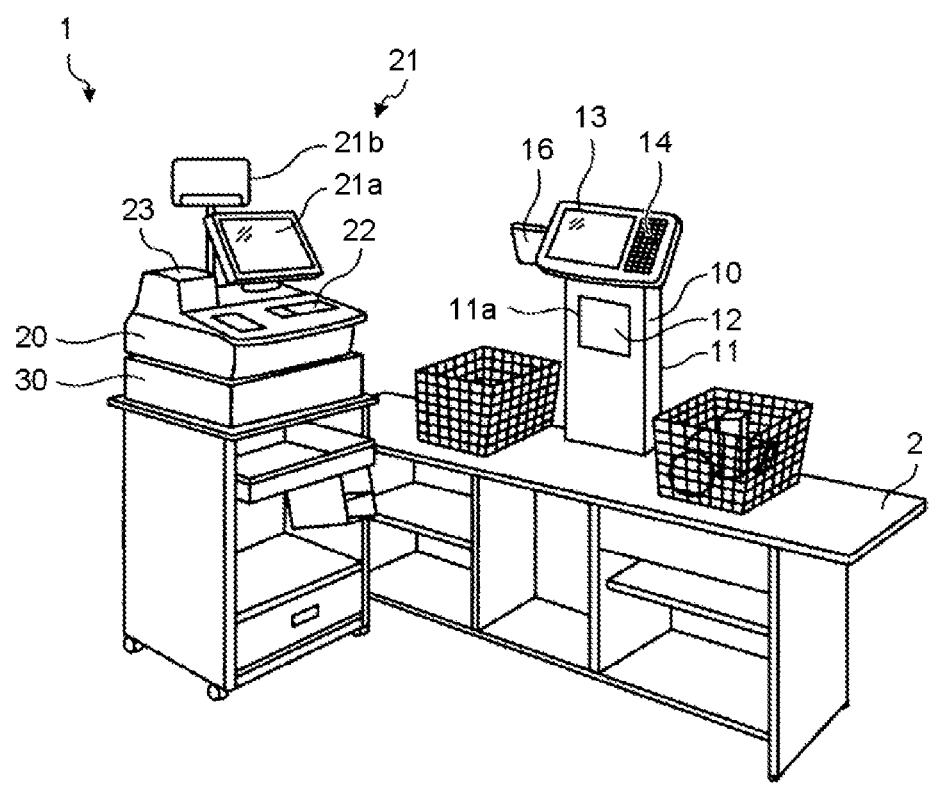
FIG. 1 is a diagram illustrating the whole constitution of a POS system according to one embodiment.

Hereinafter, the present embodiment is described with reference to the accompanying drawings. FIG. 1 is a perspective view illustrating the whole constitution of a POS system 1 according to the embodiment.

As shown in FIG. 1, the POS (Point Of Sales) system 1 (store system) includes a reading apparatus 10 serving as a vertical scanner, and a POS terminal 20 serving as a commodity sales data processing device for executing sales registration processing according to an image captured by the reading apparatus 10. The reading apparatus 10 is arranged on a checkout table 2, on which shopping baskets and the like are placed, at a position (substantially central portion) where an operator and a customer stand in a face to face manner. The POS terminal 20 is arranged nearby one of the end portions of the checkout table 2. The reading apparatus 10 and the POS terminal 20 are connected with each other to be capable of communicating through a transmission line (not shown). The reading apparatus 10 and the POS terminal 20 constitute the store system 1.

The POS terminal 20 executes sales registration processing including checkout processing based on various kinds of data of the commodities purchased by the customer. The POS terminal 20 is arranged above a drawer 30 which stores coins and bills in such a manner that coins and bills can be put in and taken out freely. The POS terminal 20 is equipped with two display devices 21 including a display for operator 21a and a display for customer 21b, an input device 22 including a keyboard and a mode key, and a receipt printer 23. The display device 21 and the input device 22 constitute a user interface having an information input function for inputting information by the user and an information output function for outputting information to the user.

Next, the constitution of the reading apparatus 10 is described with reference to FIG. 2. FIG. 2 (*a*) is a perspective view illustrating the reading apparatus 10 at a side of the apparatus 10 where an image capturing window 11*a* is arranged. FIG. 2 (*b*) is a perspective view illustrating the reading apparatus 10 at a side of the apparatus 10 opposite to the side where the image capturing window 11*a* is arranged.

As shown in FIG. 2, the reading apparatus 10 includes a main body 11, a first image capturing section 12, a first display section 13, a keyboard 14, a second image capturing section 15, and a second display section 16.

The main body 11 is formed in a substantially rectangular shape and is arranged on the checkout table 2. The height of the main body 11 on the checkout table 2 is, for example, preferred to be as high as the eyes of an operator.

The image capturing window 11*a* (opening) is arranged on the surface of the main body 11 facing the operator who stands in front of the reading apparatus 10. The first image capturing section 12 is arranged inside the main body 11 behind the image capturing window 11*a*. The operator holds the commodity brought by the customer over the image capturing window 11*a* to read (photograph) the commodity. The first image capturing section 12 is an image sensor including an image capturing element such as a CCD (Charge Coupled Device), a CMOS (Complementary MOS) and the like. The first image capturing section 12 photographs the area outside the main body section 11 through the image capturing window 11*a*. Specifically, the first image capturing section 12 optically photographs either a code symbol (such as a barcode, a two-dimensional code and the like) attached to the commodity held in front of the image capturing window 11*a* or the whole or part of that commodity.

The object recognition is described hereafter. The object recognition refers to a technology in which an object photographed by the first image capturing section 12 is specified (recognized) according to a feature amount obtained from the appearance of the object. The POS terminal 20 extracts appearance feature of the photographed commodity from the image (object image) captured by the first image capturing section 12 as the feature amount, and compares the extracted feature amount with the prepared feature amount (reference data) of a reference commodity to specify (recognize) the photographed commodity. The appearance feature of the commodity refers to the shape, tint, concave-convex state and the like.

The first display section 13, serving as a display for operator, is arranged on the main body 11 above the image capturing window 11*a*. The first display section 13 is constituted by a display device such as an LCD (Liquid Crystal Display) and the like equipped with a touch panel. The first display section 13 displays a commodity name, unit price and the like of the registered commodity to the operator in the sales registration processing carried out by the POS terminal 20.

The keyboard 14 is arranged nearby the first display section 13 in a side by side manner. The keyboard 14 includes various keys and the like for registering the commodity that cannot be registered with the code symbol or object image. It is shown in FIG. 2 that the first display section 13 and the keyboard 14 are arranged integrally, however, they may be arranged separately.

An upper surface 11*b* of the main body 11 (shown in FIG. 2 (*b*)) is inclined downwards from the operator side to the customer side opposite to the operator side. The second image capturing section 15 is arranged on the inclined surface.

Figure 3:
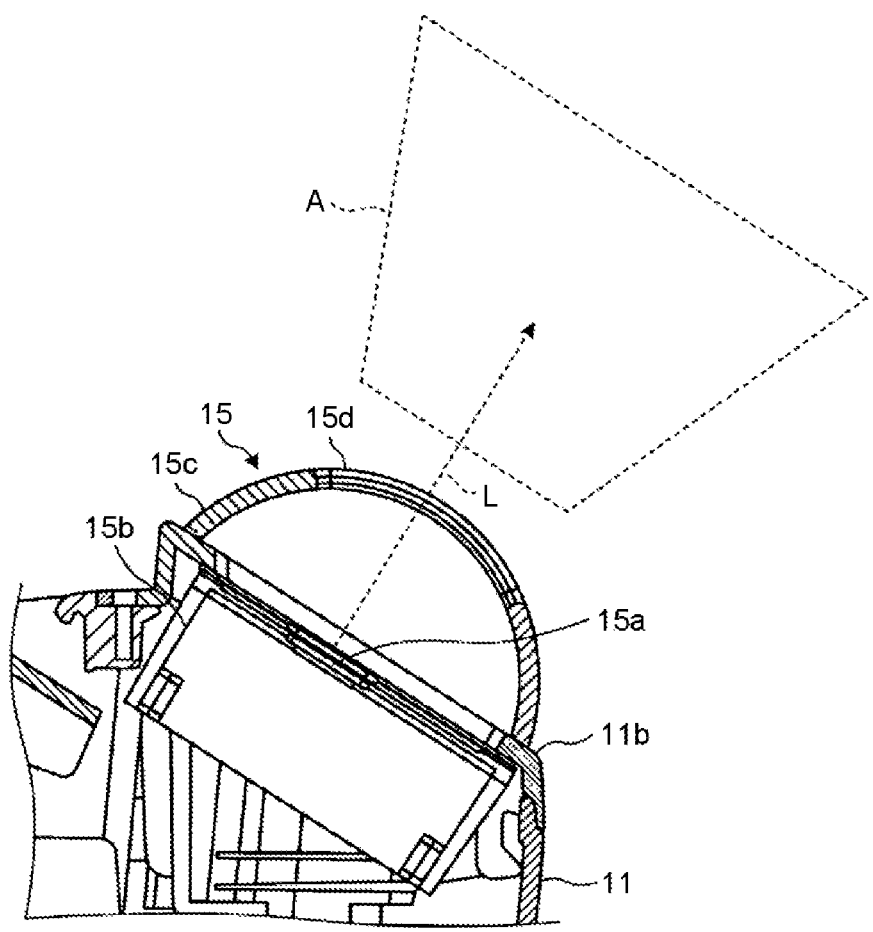
FIG. 3 is a schematic cross-sectional view illustrating the constitution of an upper surface portion of the reading apparatus.

FIG. 3 is a schematic cross-sectional view illustrating the constitution of the upper surface portion of the reading apparatus 10. As shown in FIG. 3, the second image capturing section 15 is arranged in such a manner that a portion thereof is buried in the upper surface 11*b*. The second image capturing section 15 is provided with an image capturing device 15*b* including an image capturing element 15*a* such as a CCD, CMOS and the like, and a cover 15*c* covering the image capturing device 15*b*.

The image capturing device 15*b* is arranged inside the main body 11 (below the upper surface 11*b*) in parallel to the inclined upper surface 11*b*. An optical axis direction (image capturing direction) L of the image capturing device 15*b* is substantially orthogonal to the inclined upper surface 11*b*, that is, the optical axis direction of the image capturing device 15*b* is directed to the upper portion of the customer who stands opposite to the operator.

The cover 15*c* is formed in a substantially semi-cylindrical shape (arch shape). An image capturing window 15*d* is arranged at a part of the area of the cover 15*c* of which the center locates on the optical axis direction L of the image capturing device 15*b*. Light permeable resin or glass is fit into the image capturing window 15*d* in a manner of matching with the arch shape of the cover 15*c*. The image capturing device 15*b* photographs the object held over an area above the image capturing window 15*d* (image capturing area A) through the image capturing window 15*d*.

The first image capturing section 12 is used in the reading (photographing) carried out by the operator, while the second image capturing section 15 is used in the reading carried out by the customer. Specifically, the second image capturing section 15 optically photographs a specified object held by the customer. According to the present embodiment, the specified object may be, for example, a service card (membership card, point card and the like) held by the customer. The object to be photographed may also be a paper medium such as an advertisement (flier) on which information announcing a service-sale such as a discount is printed. The object to be photographed may further be a portable communication terminal the display screen of which displays the service-sale information.

It is exemplified in the present embodiment that the second image capturing section 15 is arranged in a state of protruding from the upper surface 11*b*, however, it is not limited to this. For example, the upper surface 11*b* may be a flat surface with the cover 15*c* removed. Further, it is exemplified in the present embodiment that the second image capturing section 15 is integrally arranged with the main body 11, however, the second image capturing section 15 may be arranged separately from the main body 11 in a detachable manner.

Return to FIG. 2. The second display section 16, serving as a display for customer, is arranged nearby the second image capturing section 15. The second display section 16 is constituted by a display device such as an LCD and the like equipped with a touch panel. The second display section 16 displays a commodity name, unit price and the like of the registered commodity to the customer in the sales registration processing carried out by the POS terminal 20. The second display section 16 further displays a message or an image for instructing the reading by the second image capturing section 15. In addition, it is exemplified in the present embodiment that the second display section 16 is supported at a side of the main body 11 by a supporting member (not shown), however, it is not limited to this.

Figure 4:
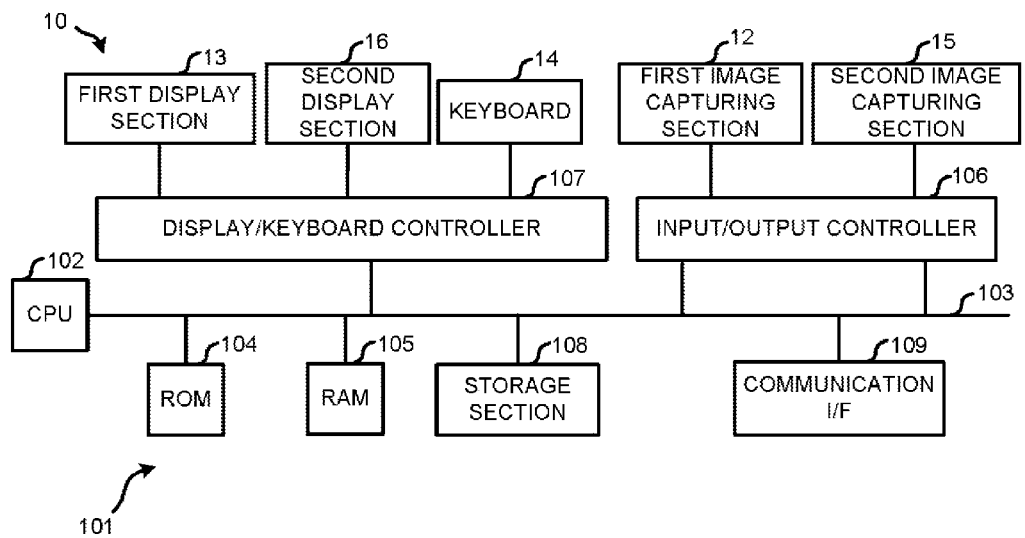
FIG. 4 is a block diagram illustrating the electrical connection of the reading apparatus.

Next, the electrical connection of the reading apparatus 10 is described. FIG. 4 is a block diagram illustrating the electrical connection of the reading apparatus 10. As shown in FIG. 4, the reading apparatus 10 is provided with a microcomputer 101 which controls each section of the apparatus 10. The microcomputer 101 is constituted by connecting a CPU (Central Processing Unit) 102 with a ROM (Read Only Memory) 104 and a RAM (Random Access Memory) 105 through a bus line 103. The CPU functionally controls each section. The ROM 104 stores fixed or basic information such as a control program and the like in advance. The RAM 105 stores various data in a rewritable manner and functions as a work area. Thus, the microcomputer 101 constitutes an information processing section for executing data processing. The entire or part of the RAM 105 is a nonvolatile memory.

The microcomputer 101 is connected with an input/output controller 106, a display/keyboard controller 107, a storage section 108 and a communication interface 109 through the bus line 103.

The input/output controller 106 is connected with the first image capturing section 12 and the second image capturing section 15. The input/output controller 106 outputs the image (image data) captured by the first image capturing section 12 and the second image capturing section 15 to the microcomputer 101. The input/output controller 106 also outputs a control signal output from the microcomputer 101 to the first image capturing section 12 and the second image capturing section 15.

The display/keyboard controller 107 drives the first display section 13 and the second display section 16 to display various images on the display device 21. The display/keyboard controller 107 outputs an operation signal in response to the touch operation on the first display section 13 and the second display section 16, and an operation signal from the keyboard 14 to the microcomputer 101.

The storage section 108 is a storage device such as an HDD (Hard Disk Drive), and an SSD (Solid State Drive). The storage section 108 stores various data relating to the operations of the reading apparatus 10.

The communication interface 109 enables the reading apparatus 10 to carry out data communication with other machines (POS terminal 20) through a connecting wire such as a LAN cable and the like. For example, the communication interface 109 sends images acquired from the first image capturing section 12 and the second image capturing section 15 and operation signal to the POS terminal 20 as an input data. The communication interface 109 receives data for display on the first display section 13 and the second display section 16 from the POS terminal 20.

Figure 5:
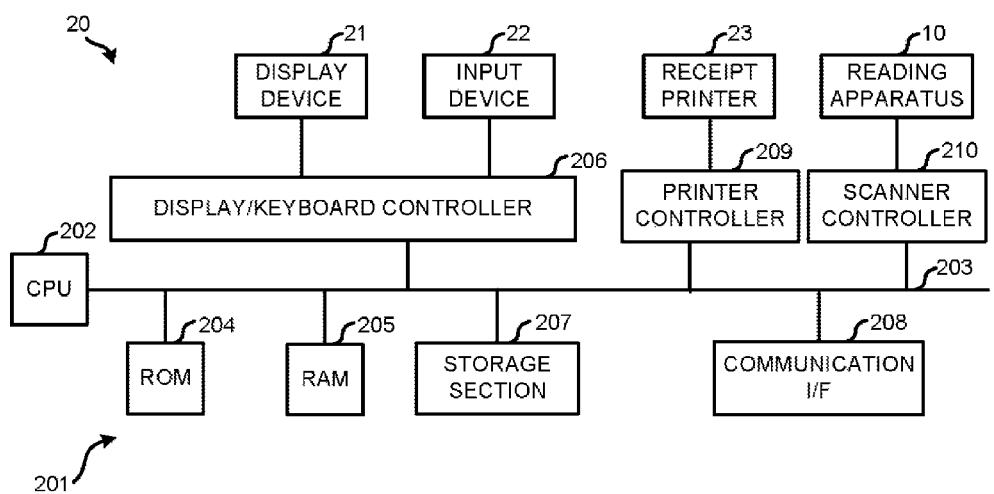
FIG. 5 is a block diagram illustrating the electrical connection of the POS terminal.

Next, the electrical connection of the POS terminal 20 is described. FIG. 5 is a block diagram illustrating the electrical connection of the POS terminal 20. As shown in FIG. 5, the POS terminal 20 is provided with a microcomputer 201 which controls each section of the POS terminal 20. The microcomputer 201 is constituted by connecting a CPU 202 with a ROM (Read Only Memory) 204 and a RAM (Random Access Memory) 205 through a bus line 203. The CPU functionally controls each section. The ROM 204 stores fixed or basic information such as a control program and the like in advance. The RAM 205 stores various data in a rewritable manner and functions as a work area. Thus, the microcomputer 201 constitutes an information processing section for executing data processing. The entire or part of the RAM 205 is a nonvolatile memory.

The microcomputer 201 is connected with a display/keyboard controller 206, a storage section 207, a communication interface 208, a printer controller 209 and a scanner controller 210 through the bus line 203.

The display/keyboard controller 206 controls the display device 21 based on the image data, displays an image corresponding to the image data on the display device 21, and acquires input data from the input device 22 into the microcomputer 201.

The storage section 207 is a storage device such as an HDD, and an SSD. The storage section 207 stores various data. The storage section 207 also stores, for example, programs for various processing in the POS terminal 20, a commodity master file, a sales data file and the like (none is shown). The commodity master file stores a unit price, commodity name and the like in association with the commodity code. The sales data file stores transaction number, transaction type, and the sales data in one transaction.

The communication interface 208 enables the POS terminal 20 to carry out data communication with other machines through a connecting wire such as a LAN cable and the like. For example, the communication interface 208 receives the input data sent from the reading apparatus 10. The communication interface 208 also sends a signal for display on the first display section 13 and the second display section 16 to the reading apparatus 10.

The printer controller 209 controls the receipt printer 23 based on the printing data to print an image corresponding to the printing data by the receipt printer 23.

The scanner controller 210 acquires the input data from the reading apparatus 10 into the microcomputer 201. The scanner controller 210 controls the first display section 13 and the second display section 16 to display various images on the first display section 13 and the second display section 16.

Figure 6:
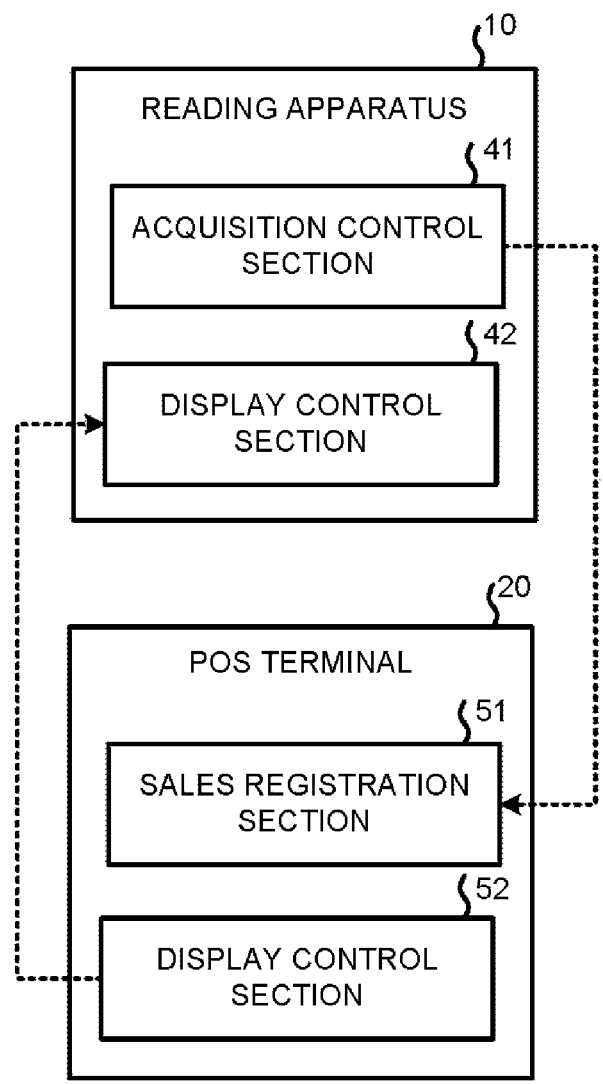
FIG. 6 is a diagram illustrating the functional components of the reading apparatus and the POS terminal.

Next, the functional components of the reading apparatus 10 and the POS terminal 20 are described. FIG. 6 is a diagram illustrating the functional components of the reading apparatus 10 and the POS terminal 20.

The reading apparatus 10 operates according to the programs stored in the storage section 108 to function as an acquisition control section 41 and a display control section 42 as shown in FIG. 6.

The acquisition control section 41 controls acquisition and transmission of the images captured by the first image capturing section 12 and the second image capturing section 15. Specifically, the acquisition control section 41 starts acquisition of the images through the input/output controller 106 if the transaction start is instructed through an operation on the keyboard 14 or the first display section 13, or a signal notified from the POS terminal 20.

The acquisition control section 41 sends the acquired image data or additional information to the POS terminal 20 through the communication interface 109. The acquisition control section 41 stops the acquisition of the images if end of the transaction is instructed through an operation on the keyboard 14 or the first display section 13, or a signal notified from the POS terminal 20. The acquisition control section 41 may stop the operations of the first image capturing section 12 and the second image capturing section 15, and in this case, the acquisition control section 41 starts the operations of the first image capturing section 12 and the second image capturing section 15 in response to the transaction start instruction described above.

As stated below, in the POS terminal 20, the processing manner of the image data is different depending on the image captured by the first image capturing section 12 or by the second image capturing section 15. Thus, an identifier for indicating a sending source of the image data (the first image capturing section 12 or the second image capturing section 15) may be added to the image data by the acquisition control section 41 at the time the image data is acquired to identify whether the image is captured by the first image capturing section 12 or by the second image capturing section 15. Alternatively, the first image capturing section 12 and the second image capturing section 15 add an identifier indicating itself to the image at the time the image is captured.

The display control section 42 controls the display of the first display section 13 and the second display section 16. Specifically, the display control section 42 controls the first display section 13 or the second display section 16 to display various kinds of information such as transaction details and a guidance screen described later on the first display section 13 or the second display section 16 based on a display control signal input from the POS terminal 20.

On the other hand, as shown in FIG. 6, the POS terminal 20 operates according to the programs stored in the storage section 207 to function as a sales registration section 51 and a display control section 52.

The sales registration section 51 executes sales registration processing relating to the sales registration of the commodity. The sales registration section 51 notifies the reading apparatus 10 of the transaction start to start the sales registration processing if receiving an operation instructing the transaction start through the input device 22.

In the sales registration processing, the sales registration section 51 carries out sales registration of the commodity based on the image input from the reading apparatus 10. Specifically, the sales registration section 51 specifies, according to the image (the image of the code symbol attached to the commodity, or the object image of the whole or part of the commodity) captured by the first image capturing section 12, the commodity corresponding to the image from the commodity master file, and carries out sales registration of the specified commodity.

If the image captured by the second image capturing section 15 is received, the sales registration section 51 executes the predetermined processing corresponding to the image. For example, in a case in which the image captured by the second image capturing section 15 is a service card such as a membership card, a point card and the like, the sales registration section 51 reads identification information (membership number and the like) for identifying the customer from the image. Then the sales registration section 51 gives points calculated according to the total amount of the transaction in association with the identification information. In a case in which the image captured by the second image capturing section 15 is service or complementary information indicating to provide a discount and the like, the content in the service or complementary information is read from the image, and the processing corresponding to the content such as a discount is applied to the total amount of the transaction. The technology for reading (recognizing) character string from the image is a well-known/well-used technology such as an OCR (Optical Character Reader), and therefore the explanation thereof is omitted.

If an operation instructing end of the transaction is received through the input device 22, the sales registration section 51 notifies the reading apparatus 10 of the end of the transaction to terminate the sales registration processing.

The display control section 52 controls the screen to be displayed on the reading apparatus 10 through the cooperation with the display control section 42 of the reading apparatus 10. Specifically, the display control section 52 generates display data for the transaction details corresponding to the sales registration processing carried out by the sales registration section 51 and displays the data on the first display section 13 and the second display section 16. The transaction details include, for example, the commodity name, unit price, total amount. The display control section 52 displays the display data for the transaction details on the second display section 16 from the start of the sales registration processing until at least the transaction is finalized or completely registered. The display control section 52 also displays a message or an image for instructing the reading by the second image capturing section 15 on the second display section 16.

The programs executed in the reading apparatus 10 and the POS terminal 20 of the present embodiment are recorded in a computer-readable recording medium such as CD-ROM, flexible disk (FD), CD-R, DVD (Digital Versatile Disk) and the like in the form of installable or executable file.

Further, the programs executed in the reading apparatus 10 and the POS terminal 20 of the present embodiment may be stored in a computer connected with a network such as Internet, and downloaded via the network. Further, the programs executed in the reading apparatus 10 and the POS terminal 20 of the present embodiment may also be provided or distributed via a network such as the Internet.

Figure 7:
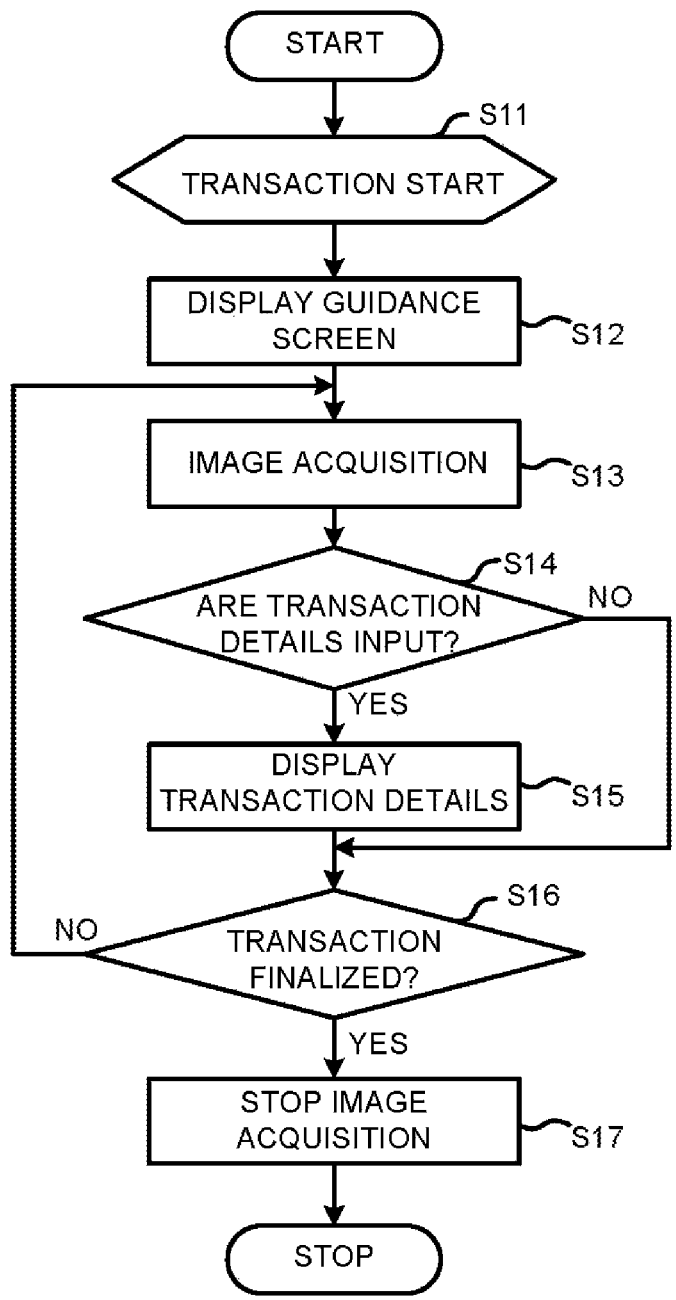
FIG. 7 is a flowchart illustrating an example of reading processing carried out by the reading apparatus.

Operation of the POS system 1 is described. First, the reading processing carried out by the reading apparatus 10 is described with reference to FIG. 7. FIG. 7 is a flowchart illustrating an example of the reading processing carried out by the reading apparatus 10.

If the start of the transaction is instructed (ACT S11), the display control section 42 of the reading apparatus 10 displays a message or an image for instructing the reading by the second image capturing section 15 on the second display section 16 as a guidance screen through the cooperation with the display control section 52 of the POS terminal 20 (ACT S12).

Next, the acquisition control section 41 starts to acquire images from the first image capturing section 12 and the second image capturing section 15 (ACT S13). In this way, the acquired images are sent to the POS terminal 20.

When the transaction is started, the operator of the reading apparatus 10 holds the commodities to be purchased over the image capturing window 11*a* one by one to read (photograph) the commodities in sequence. In this way, the images of the commodities are output sequentially from the first image capturing section 12.

On the other hand, in the reading apparatus 10 of the present embodiment, the customer inputs various kinds of information by himself/herself through the second image capturing section 15 oriented to the customer side. Thus, the customer can hold the membership card, advertisement medium or the display screen of the information communication terminal toward the second image capturing section 15 to input additional information such as identification information and the like while the commodities' are read by the operator.

In this way, since the reading (photographing) of the commodities and the reading of the additional information can be carried out in parallel, the work efficiency relating to the reading work can be improved. Further, since time and labor of showing, for example, the information communication terminal or the member card to the operator by the customer can be saved, customer convenience can be enhanced.

Next, the display control section 42 determines whether or not the display data of the transaction details is input from the POS terminal 20 (ACT S14). If it is determined that the display data of the transaction details is not input (NO in ACT S14), the processing in ACT S16 is executed. If it is determined that the display data of the transaction details is input (YES in ACT S14), the display control section 42 displays the transaction details on the first display section 13 and the second display section 16 (ACT S15), and then the processing in ACT S16 is executed.

The microcomputer 101 of the reading apparatus 10 executes the processing in ACT S13-ACT S15 repeatedly (NO in ACT S16) until the transaction is finalized through an operation on the POS terminal 20. Then if an instruction for finalizing the transaction is received (YES in ACT S16), the acquisition control section 41 stops the acquisition of the images from the first image capturing section 12 and the second image capturing section 15 (ACT S17), and then the present processing is terminated.

Figure 8:
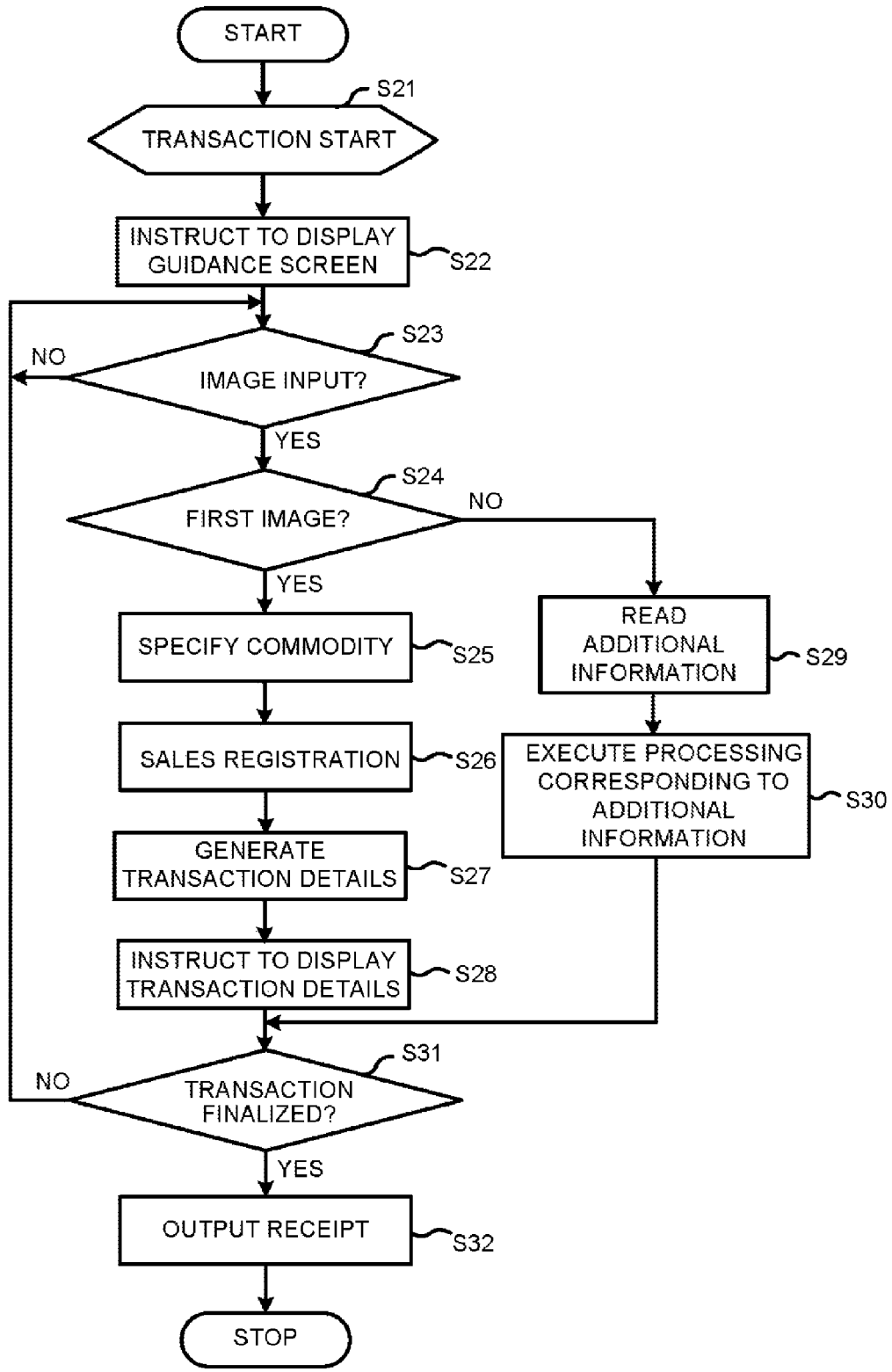
FIG. 8 is a flowchart illustrating an example of sales registration processing carried out by the POS terminal.

Next, the sales registration processing carried out by the POS terminal 20 is described with reference to FIG. 8. FIG. 8 is a flowchart illustrating an example of the sales registration processing carried out by the POS terminal 20.

If the start of the transaction is instructed (ACT S21), the display control section 52 of the POS terminal 20 displays a guidance screen for instructing the reading by the second image capturing section 15 on the second display section 16 through the cooperation with the display control section 42 of the reading apparatus 10 (ACT S22).

Next, the sales registration section 51 waits for until an image is input from the reading apparatus 10 (NO in ACT S23). In a case in which an image (first image) acquired from the first image capturing section 12 is input (YES in ACT S23, and YES in ACT S24), the sales registration section 51 specifies the commodity corresponding to the first image from the commodity master file (ACT S25). The sales registration section 51 executes sales registration processing of the specified commodity (ACT S26).

Next, the display control section 52 of the POS terminal 20 generates the display data of the transaction details (commodity name, unit price, total amount and the like) corresponding to the sales registration (ACT S27). The display control section 52 displays the transaction details (display data) on the first display section 13 and the second display section 16 through the cooperation with the display control section 42 of the reading apparatus 10 (ACT S28).

The transaction details in the second display section 16 may be displayed together with the guidance screen; alternatively, the detail screen is displayed after the guidance screen is deleted. For example, in a case in which the image captured by the second image capturing section 15 is already received, the guidance screen is deleted; otherwise, the guidance screen may be resized to a reduced area and the detail screen is displayed in the remaining area to display both screens on the second display section 16.

On the other hand, in a case in which an image acquired from the second image capturing section 15 is input (YES in ACT S23, and NO in ACT S24), the sales registration section 51 reads additional information such as identification information for identifying the customer, the content of the provided service and the like from the image (ACT S29). The sales registration section 51 executes the processing (point giving processing, discount processing and the like) according to the additional information (ACT S30). Further, the processing result in ACT S30 may be displayed on the first display section 13 and the second display section 16.

The microcomputer 201 of the POS terminal 20 executes the processing in ACT S23-ACT S30 repeatedly (NO in ACT S31) until a closing key (not shown) on the keyboard 14 is operated to finalize the transaction. If finalization of the transaction is declared through the operation on the closing key (YES in ACT S31), the microcomputer 201 of the POS terminal 20 outputs the transaction details and the processing result in ACT S30 from the receipt printer 23 (ACT S32), and then the present processing is terminated.

As stated above, in accordance with the present embodiment, the first image capturing section 12 for operator and the second image capturing section 15 for customer are used, and thus reading operations of various kinds of information relating to the transaction (sales registration) can be carried out in parallel with one another. Therefore, the work efficiency relating to the reading work can be improved and customer and shop clerk convenience can be enhanced. Since the second image capturing section 15 is arranged at the upper surface 11b of the reading apparatus 10 (main body 11), the space of the upper surface 11b at which the second image capturing section 15 is mounted is used effectively and thus the reading apparatus 10 can be minimized.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, it is exemplified in the embodiment described above that the display control section 52 of the POS terminal 20 controls display in the reading apparatus 10, however, it is not limited to this. For example, the display control section 42 of the reading apparatus 10 may include the whole or part of the functions of the display control section 52, in this way, the display control section 42 of the reading apparatus 10 can control display by itself. Further, the reading apparatus 10 may include the whole or part of the functions of the sales registration section 51. For example, it is applicable to carry out operations such as reading of the additional information and the specification of the commodity from the images captured by the second image capturing section 15 and the first image capturing section 12 at the side of the reading apparatus 10, and then the reading apparatus 10 outputs the results of the operations to the POS terminal 20.

Furthermore, it is exemplified in the embodiment described above that the POS system 1 is constituted with the reading apparatus 10 (vertical scanner) and the POS terminal 20 which are separated, however, the present invention is not limited to this. For example, the POS system 1 may be constituted with the reading apparatus 10 and the POS terminal 20 which are integrated.

What is claimed is:

1. A reading apparatus arranged at a position between an operator and a customer who stand in a face to face manner, comprising:
a main body having an operator side, a customer side, and a top surface, wherein the operator side includes an opening;
a first substantially vertical image capturing section, housed in the opening on the operator side of the main body, configured to capture an image of a commodity when the operator holds the commodity to be purchased in front of the opening;

a first display section, arranged above the opening of the main body, configured to display information relating to a sales registration process for the operator;

a second image capturing section, attached to the top surface of the main body behind a back side of the first display section, configured to capture an image of an object held over an upper surface of the second image capturing section by the customer, wherein the upper surface is inclined and an optical axis direction for image capturing of the second image capturing section is substantially orthogonal to the inclined upper surface and directed to an upper portion of the customer standing opposite the operator;

a second display section, arranged nearby the second image capturing section, configured to display a guidance screen instructing the customer to hold the object in front of the second image capturing section so that an image of the object is captured, wherein the second display section is configured to receive an input operation from the customer;

a processing section configured to execute a sales registration processing; and an output section configured to acquire images captured by a first image capturing section and the second image capturing section to output the images to the processing section, wherein the output section is configured to, when a transaction start is instructed:
  acquire the images captured by the first image capturing section and the second image capturing section, and
  add an identifier to each image, the identifier being indicative of a source that captures an image at a time of the image being acquired, to be output to the processing section.

2. The reading apparatus according to claim 1, wherein the upper surface of the main body is inclined downwards from the side facing the operator to a side facing the customer.

3. The reading apparatus according to claim 1, wherein the second image capturing section is further configured to read a membership card as the object held over the upper surface of the second image capturing section while the operator holds the commodity to be purchased in front of the first image capturing section.

4. The reading apparatus according to claim 3, further comprising a sales registration section configured to read information from the membership card and calculate a discount for the commodity to be purchased.

5. The reading apparatus according to claim 3, further comprising a sales registration section configured to read information from the membership card and calculate points for an account associated with the membership card based on a total amount of a sales transaction.

6. An apparatus, comprising:
a main body having an operator side, a customer side, and a top surface;
a vertical image capturing section on the operator side of the main body, configured to capture an image of a commodity when an operator holds the commodity to be purchased in front of the vertical image capturing section;
a first display section attached to the main body, configured to display information relating to a sales registration processing for an operator;
an inclined image capturing section on the top surface of the main body behind a back side of the first display section and positioned towards the customer side of the main body, configured to capture an image of an object held over the inclined image capturing section;
a second display section attached to the main body, configured to display a guidance screen instructing a customer to hold the object over the inclined image capturing section, wherein the second display section is configured to receive an input operation from the customer;
a processing section configured to execute a sales registration processing; and
an output section configured to acquire images captured by a first image capturing section and the second image capturing section to output the images to the processing section, wherein the output section is configured to, when a transaction start is instructed:
  acquire the images captured by the first image capturing section and the second image capturing section, and
  add an identifier to each image, the identifier being indicative of a source that captures an image at a time of the image being acquired, to be output to the processing section.

7. The apparatus of claim 6, wherein an optical axis direction of the inclined image capturing section is directed towards a customer positioned on the customer side of the main body.

8. The apparatus of claim 6, wherein the inclined image capturing section is positioned above the vertical image capturing section.

9. The apparatus of claim 6, wherein the inclined image capturing section includes a substantially semi-cylindrical cover.

10. The apparatus of claim 6, wherein the first display is attached to the operator side of the main body.

11. The apparatus of claim 6, wherein the second display is attached to the customer side of the main body.

12. An apparatus, comprising:
a main body having an operator side, a customer side, and a top surface;
a vertical image capturing section on the operator side of the main body, configured to capture an image of a commodity when an operator holds the commodity to be purchased in front of the vertical image capturing section;
a first display section attached to the main body, configured to display information relating to a sales registration processing for an operator;
an inclined image capturing section on the top surface of the main body behind a back side of the first display section and positioned towards the customer side of the main body, configured to capture an image of a membership card held over the inclined image capturing section, wherein the capturing of the commodity and the membership card occur at the same time;
a second display section attached to the main body, configured to display a guidance screen instructing a customer to hold the object over the inclined image capturing section, wherein the second display section is configured to receive an input operation from the customer;
a processing section configured to execute a sales registration processing; and
an output section configured to acquire images captured by a first image capturing section and the second image capturing section to output the images to the processing section, wherein the output section is configured to, when a transaction start is instructed:

acquire the images captured by the first image capturing section and the second image capturing section, and add an identifier to each image, the identifier being indicative of a source that captures an image at a time of the image being acquired, to be output to the processing section.

13. The apparatus of claim 12, wherein an optical axis direction of the inclined image capturing section is directed towards a customer positioned on the customer side of the main body.

14. The apparatus of claim 12, wherein the inclined image capturing section is positioned above the vertical image capturing section.

15. The apparatus of claim 12, wherein the inclined image capturing section includes a substantially semi-cylindrical cover.

16. The apparatus of claim 12, wherein the first display is attached to the operator side of the main body and the second display is attached to the customer side of the main body.

* * * * *